US006634489B2

(12) United States Patent
Kraus

(10) Patent No.: US 6,634,489 B2
(45) Date of Patent: Oct. 21, 2003

(54) WALKING BEAM CONVEYOR FOR A CONTINUOUS FURNACE FOR HEATING ALUMINIUM BARS

(75) Inventor: Günther Kraus, Braunau (AT)

(73) Assignee: Hertwich Engineering GmbH, Braunau (AT)

( * ) Notice: Subject to any disclaimer, the term of this patent is extended or adjusted under 35 U.S.C. 154(b) by 0 days.

(21) Appl. No.: 10/045,873

(22) Filed: Jan. 14, 2002

(65) Prior Publication Data

US 2002/0092733 A1 Jul. 18, 2002

(30) Foreign Application Priority Data

Jan. 15, 2001 (AT) .............................................. 53/2001

(51) Int. Cl.[7] .............................................. B65G 25/00
(52) U.S. Cl. ..................................... 198/774.1; 198/777
(58) Field of Search .......................... 198/774.1, 774.2, 198/774.3, 774.4, 777; 414/746.6

(56) References Cited

U.S. PATENT DOCUMENTS 3,584,736 A * 6/1971 De Mallie et al. .......... 198/777
3,685,670 A * 8/1972 Meyers ........................ 414/567
4,271,959 A * 6/1981 Eibe ............................ 198/777
4,407,407 A * 10/1983 Eibe ............................ 198/777
4,958,718 A * 9/1990 Schmiedberg .............. 198/456
5,605,427 A * 2/1997 Hammond .................. 414/276

FOREIGN PATENT DOCUMENTS

| | | |
|---|---|---|
| DE | 2 020 318 | 4/1970 |
| DE | 25 42 884 | 3/1977 |
| DE | 43 43 675 | 6/1995 |

* cited by examiner

*Primary Examiner*—Christopher P. Ellis
*Assistant Examiner*—Richard Ridley
(74) *Attorney, Agent, or Firm*—Collard & Roe, P.C.

(57) ABSTRACT

A walking beam conveyor for a continuous furnace (7) for heating aluminium bars (4) with walking beams and fixed beams (1, 2) is described, which support bar supports (3) which can be restrictively pivoted transversely to the beams (1, 2). In order to create advantageous structural conditions, it is proposed that the bar supports (3) have support members (10) for the aluminium bars (4) which can be inserted into recesses (11).

3 Claims, 2 Drawing Sheets

WALKING BEAM CONVEYOR FOR A CONTINUOUS FURNACE FOR HEATING ALUMINIUM BARS

FIELD OF THE INVENTION

The present invention relates to a walking beam conveyor for a continuous furnace for heating aluminium bars with walking beams and fixed beams bearing bar supports which can be restrictively pivoted transversely to the beams.

DESCRIPTION OF THE PRIOR ART

Aluminium bars are subjected to heat treatment to improve their ductility after casting, and predominantly so in continuous furnaces which are equipped with walking beam conveyors for the aluminium bars. These walking beam conveyors have fixed beams running in the feed direction and parallel walking beams between these fixed beams, which similarly to the fixed beams bear bar supports to take up the aluminium bars running transversely to the beams. With each conveying step the aluminium bars are lifted off from the bar supports of the fixed beams by the walking beams and laid on the next supporting row of fixed beams in the feed direction, before the walking beams under the aluminium bars are moved into the starting position for the subsequent conveying step. Due to unavoidable relative movements made between the aluminium bars and the bar supports solid with the beams aluminium deposits form on the bar supports. These deposits—mostly low-melting eutectics which reach the bar surface via liquation procedures during casting—harden as a result of oxidising and because of their uneven distribution cause depressions in the surface of the comparatively soft aluminium bars at the processing temperature. To avoid surface damage the deposits must be ground off the bar supports, requiring considerable effort to be made in the restricted space of the furnace and with the plurality of bar supports.

In the interests of eliminating these drawbacks it has already been proposed to connect the bar supports not rigidly with the beams, but rather to support them with limited pivoting range on the beams, and transversely to the longitudinal direction of the beams, so that the bar supports can match the respective path of the aluminium bars in their pivot position. In combination with more even loading the associated decrease in relative movement leads to a delay in deposits forming. And since the bar supports can be removed from the beams, the deposits do not have to be ground in the restricted space of the furnace, resulting overall in noticeable improvements with respect to maintenance of these walking beam conveyors, although exchanging the bar supports still requires considerable effort.

Attempts to prevent aluminium from sticking to the bar supports by appropriate choice of material have lead to the use of aluminium alloys with added manganese for the bar supports, which does, however, bring the risk of excessive distortion of the bar supports under the prevailing loads at processing temperatures required for the aluminium bars due to the then reduced stability of the support material.

Finally, in the case of water-cooled support pipes for walking beams of a walking hearth furnace it is known (DE 2 020 318 B) to clamp saddles down onto the cooled support pipe, and certainly by means of mounting brackets for wearing parts which develop a high-temperature support of the mounting when the support pipe is used as a walking beam, but which can also be inserted into longitudinal grooves of the mountings, whenever the support pipe serves as slide rail. In both these applications the high-temperature wearing parts produce a support for the material to be processed, which is connected substantially rigidly to the support pipe and is therefore not suited to taking up aluminium bars.

SUMMARY OF THE INVENTION

The object of the invention therefore is to provide a walking beam conveyor for a continuous furnace for heating aluminium bars of the type initially described, such that maintenance work required as a result of aluminium deposits of the bar supports can be made substantially easier.

The invention solves this task by the bar supports having support members for the aluminium bars insertable into recesses.

With separate support members for the aluminium bars being supplied advantageous conditions for the use of special materials are created, because this material utilisation can be restricted to the support members which are correspondingly mounted and supported in the recesses of the bar supports, so that even insufficiently solid materials can also be used at the required processing temperatures, without jeopardising the required form stability of the bar supports. In addition, because of the relatively low mass of the support member compared to the entire bar support not only can expensive special materials be used economically, but also the possibly necessary exchange of the support members is made considerably easier.

Particularly simple structural ratios result if the bar supports comprise one frame body each which takes up a support body for a support member enclosed by the frame body swivel-mounted on the associated beam by a cylindrical pitch surface. Loading of the support members by the aluminium bars is transferred directly to the support body and from there to the beam. Because the support body is swivel-mounted on the beam via a cylindrical pitch surface, the support body with the support member matches the respective bar path while avoiding compression across the edges, which also brings even pressure loading of the support member. This support member is enclosed together with the support body by the frame body which thus offers lateral support for the support member to the effect that flow of the material of the support member towards the frame body impairing the form stability of the support member is prevented, whenever a material with correspondingly less mechanical properties is utilised.

The frame body secures the position of the support member and of the support body relative to the beam and is therefore to be fixed non-translatably on the beam. For this purpose the frame bodies can form side cheeks laterally overlapping the beam with clearance, said cheeks being provided with longitudinal holes running transversely to the beams for accommodating a mounting bolt penetrating the beams. A simple detachable connection between the frame bodies and the beams is created by this mounting bolt. Pivoting capability of the frame body within the scope of the seesaw motion of the support member on the beam must be provided. This is achieved by the lateral play between the side cheeks of the frame body and the beam as well as by providing longitudinal holes in the side cheeks for accommodating the mounting bolt.

BRIEF DESCRIPTION OF THE DRAWING

The inventive object is illustrated by way of example in the diagram, in which.

DESCRIPTION OF THE PREFERRED EMBODIMENT

Figure 1:
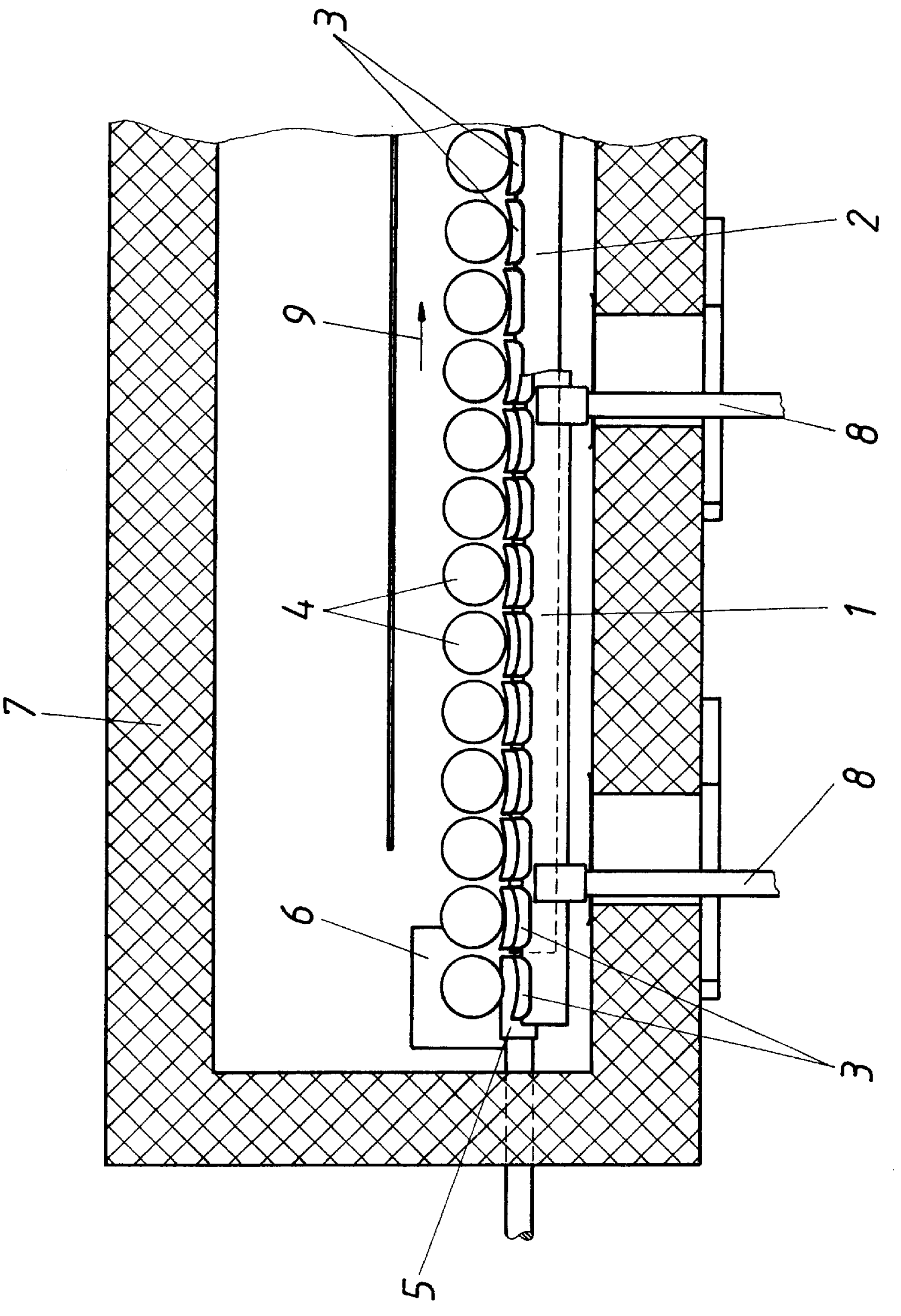
FIG. 1 shows a walking beam conveyor according to the present invention for a continuous furnace for heating aluminium bars in a partial diagrammatic longitudinal section through the continuous furnace.

The illustrated walking beam conveyor conventionally comprises alternately arranged, parallel walking beams 1 and fixed beams 2, which bear saddle-shaped bar supports 3 for aluminium bars 4 conveyed by a roller table 5 transversely to the beams 1, 2 through a furnace door 6 into the continuous furnace 7. By means of the walking beam 1, which can be lifted by means of supports 8 and adjusted in the feed direction 9, the aluminium bars 4 are lifted on the one hand from the roller table 5 and on the other hand by the bar supports 3 of the fixed beams 2 and forwarded by one conveying step, before they are lowered to each next series of bar supports 3 of the fixed beams 2 with lowering of the walking beams. The walking beams 1 are then returned underneath the aluminium bars 4 to the starting position to recommence a new conveying step.

Figure 3:
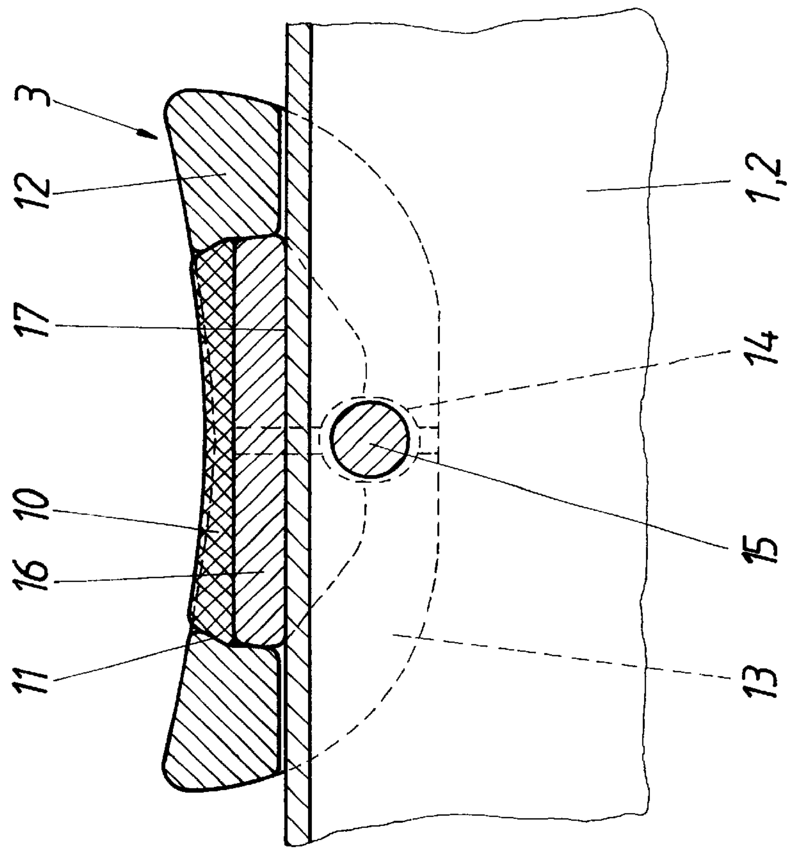
FIG. 3 shows a section according to line III—III of FIG. 2.
Figure 2:
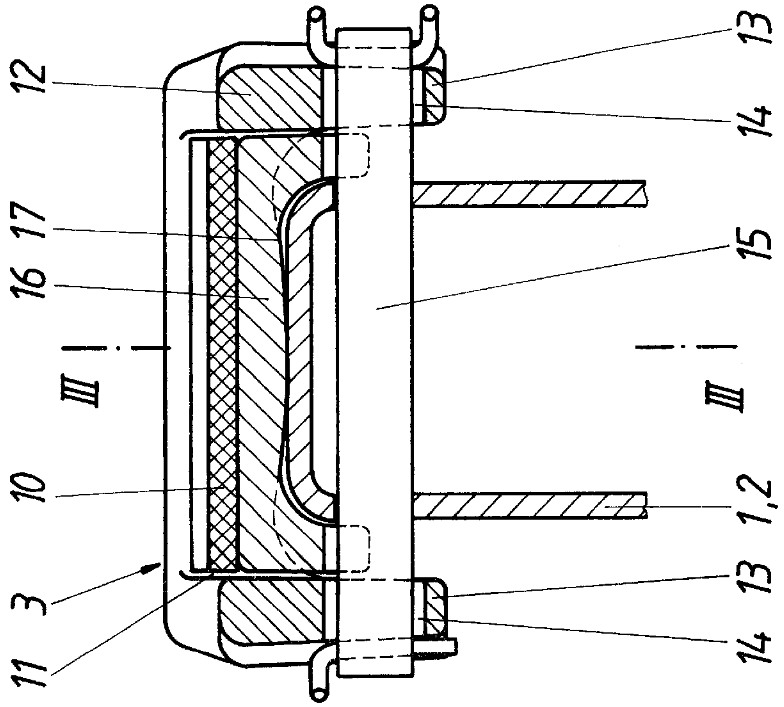
FIG. 2 shows a bar support of a walking beam or fixed beam in a section vertical to the longitudinal beam axis on an enlarged scale.

According to FIGS. 2 and 3 the saddle-shaped bar supports 3 of the walking beams and fixed beams 1, 2 have a support member 10 for the aluminium bars 4, which is set in a recess 11 of the bar support 3. According to the embodiment the recess 11 is obtained by means of a frame body 12 which overlaps the respective beams 1 or 2 with side cheeks 13. Provided in these side cheeks 13 running transversely to the beams 1 or 2 are longitudinal holes 14 for taking up a mounting bolt 15 which penetrates the respective beams 1 or 2 and axially limits the bar support 3 relative to the beam 1 or 2. According to the embodiment the admissible weight of the support members 10 by the aluminium bars 4 is decreased on the beam 1 or 2 not by the frame body 12, but rather by a support body 16. This support body 16 forms a cylindrical pitch surface 17, by means of which it is supported on the respective beam 1 or 2. The support body 16 can accordingly be pivoted transversely to the beam 1 or 2 to allow the support member 10 to match the respective course of the aluminium bars 4 to be taken up. Since the support body 16 with the support member 10 is enclosed commonly by the frame body 12, the frame body 12 must be able to be swivelled with the support body 16. This is achieved by the longitudinal holes 14 for the mounting bolt 15 on the proviso that there is adequate play between the side cheeks 13 and the beams 1 or 2.

On account of the separate support members 10 of the bar supports 3 special materials can be used economically in the support area of the aluminium bars, which extensively prevent aluminium from adhering, as is known for example for aluminium alloys with added manganese. In spite of this comparatively soft material adequate form stability of the bar supports 3 can be ensured at the required processing temperatures, since the support members 10 are supported on the frame body 12 which can comprise a heat-resistant austenitic steel casting, similarly to the support body 16. This means that the intervals between required maintenance work can be substantially prolonged. If deposits must be removed from the bar supports 3 all the same, it is only the support members 10 that need to be exchanged and ground, because only these support members 10 come in contact with the aluminium bars 4. As a result of simply loosening the frame body 12 by removing the mounting bolt 15 the support members 10 can be exchanged with relatively minimal effort despite the restricted volume relations in the continuous furnace 7.

What is claimed is:

1. A walking beam conveyor for a continuous furnace for heating aluminium bars with walking beams and fixed beams, the beams carrying bar supports for the aluminium bars, which can be restrictively pivoted transversely to the beams, and the bar supports have open recesses for insertion of support members for the aluminium bars.

2. A walking beam conveyor as claimed is claim 1, wherein each bar support comprises a frame body which takes up a support body swivel-mounted on an associated beam by way of a cylindrical pitch surface for a support member enclosed by the frame body.

3. A walking beam conveyor as claimed in claim 2, wherein the frame body has side cheeks laterally overlapping the beams with clearance, the side cheeks defining longitudinal holes extending transversely to the beams for accommodating the mounting bolt passing through the beams.

* * * * *